United States Patent
Zur et al.

(10) Patent No.: US 10,305,772 B2
(45) Date of Patent: May 28, 2019

(54) USING A SINGLE WORK ITEM TO SEND MULTIPLE MESSAGES

(71) Applicant: Mellanox Technologies Ltd., Yokneam (IL)

(72) Inventors: Itay Zur, Petach Tikva (IL); Noam Bloch, Bat Shlomo (IL); Ariel Shahar, Jerusalem (IL); Dotan Finkelstein, Ness Ziona (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 159 days.

(21) Appl. No.: 15/077,945

(22) Filed: Mar. 23, 2016

(65) Prior Publication Data

US 2016/0294926 A1 Oct. 6, 2016

Related U.S. Application Data

(60) Provisional application No. 62/139,843, filed on Mar. 30, 2015.

(51) Int. Cl.
*H04L 12/26* (2006.01)
*H04L 12/861* (2013.01)
*H04L 29/08* (2006.01)

(52) U.S. Cl.
CPC .............. *H04L 43/16* (2013.01); *H04L 49/90* (2013.01); *H04L 69/30* (2013.01)

(58) Field of Classification Search
CPC ..... H04L 69/00–69/40; H04L 49/00–49/9094; H04L 43/00–43/50
See application file for complete search history.

(56) References Cited

U.S. PATENT DOCUMENTS

| | | | | |
|---|---|---|---|---|
| 2005/0210144 A1* | 9/2005 | Kumagai | ............ | H04L 67/1002 709/229 |
| 2006/0165074 A1* | 7/2006 | Modi | ................ | H04L 29/12367 370/389 |
| 2013/0054841 A1* | 2/2013 | Padia | ...................... | G06F 3/061 710/5 |
| 2015/0261720 A1* | 9/2015 | Kagan | ................. | G06F 13/4221 710/308 |

OTHER PUBLICATIONS

PCI Express® Base Specification, Revision 3.1, 1073 pages, Mar. 2014.

Infiniband Trade Association, "InfiniBand™ Architecture Specification vol. 1", 1727 pages, Release 1.2.1, Nov. 2007.

* cited by examiner

*Primary Examiner* — Clayton R Williams
(74) *Attorney, Agent, or Firm* — Kligler & Associates

(57) ABSTRACT

A method for communication includes receiving multiple work requests from a process running on a computer to transmit respective messages over a network. A single work item corresponding to the multiple work requests is submitted to a network interface controller (NIC) connected to the computer. In response to the single work item, multiple data packets carrying the respective messages are transmitted from the NIC to the network.

20 Claims, 2 Drawing Sheets

USING A SINGLE WORK ITEM TO SEND MULTIPLE MESSAGES

CROSS-REFERENCE TO RELATED APPLICATIONS

This application claims the benefit of U.S. Provisional Patent Application 62/139,843, filed Mar. 30, 2015, which is incorporated herein by reference.

FIELD OF THE INVENTION

The present invention relates generally to computer networks, and specifically to process-to-process communication over such networks.

BACKGROUND

Processes executing on the host processor of a network node send messages to peer processes on other nodes by submitting a work request to the network interface controller (NIC) of the node. In response to the work request, NIC driver software running on the host processor generates a corresponding work item, often referred to as a work queue entry (WQE), and queues the item in the host memory for execution by the NIC. To inform the NIC that there is a new WQE awaiting execution, the driver writes a command via the host bus (such as a PCI Express bus) to a doorbell register of the NIC at a bus address that is designated for this purpose. This write operation is referred to as "ringing the doorbell" of the NIC. The NIC responds to the doorbell by fetching the WQE from the host memory and then executing the WQE, which causes the NIC to send a message, comprising one or more data packets, over the network to the peer process that was specified in the work request.

SUMMARY

Embodiments of the present invention that are described herein provide efficient techniques for interaction between a host processor and a NIC.

There is therefore provided, in accordance with an embodiment of the invention, a method for communication, which includes receiving multiple work requests from a process running on a computer to transmit respective messages over a network. A single work item corresponding to the multiple work requests is submitted to a network interface controller (NIC) connected to the computer. In response to the single work item, multiple data packets carrying the respective messages are transmitted from the NIC to the network.

In some embodiments, submitting the single work item includes, upon receiving a work request, checking a status of a queue to which the work item is to be submitted, and deciding, responsively to the status of the queue, whether to accumulate the work request into the single work item corresponding to the multiple work requests or to submit to the NIC a non-accumulated work item corresponding to the work request. In a disclosed embodiment, deciding whether to accumulate the work request includes accumulating the work request into the single work item when a size of the queue is greater than a predefined threshold, and submitting the non-accumulated work item when the size of the queue is less than the predefined threshold.

Additionally or alternatively, submitting the single work item includes, upon receiving a work request, checking a size of a message to be transmitted in response to the work request, and deciding, responsively to the size of the message, whether to accumulate the work request into the single work item corresponding to the multiple work requests or to submit to the NIC a non-accumulated work item corresponding to the work request. In a disclosed embodiment, deciding whether to accumulate the work request includes accumulating the work request into the single work item when the size of the message is less than a predefined threshold, and submitting the non-accumulated work item when the size of the message is greater than the predefined threshold.

In some embodiments, transmitting the multiple data packets includes conveying over the network, in response to the single work item, at least first and second messages directed respectively to at least first and second target processes on at least one destination node. In one embodiment, conveying at least the first and second messages includes transmitting the first and second messages to different addresses, on different nodes of the network.

There is also provided, in accordance with an embodiment of the invention, a communication system, including a network interface controller (NIC), which is configured to be coupled to a packet data network. A host processor is connected to the NIC and is configured to run a communication driver program, which receives from one or more software processes running on the host processor multiple work requests to transmit respective messages over the network, and which causes the host processor to submit to the NIC a single work item corresponding to the multiple work requests. The NIC is configured to transmit, in response to the single work item, multiple data packets carrying the respective messages to the network.

There is additionally provided, in accordance with an embodiment of the invention, communication apparatus, including a network interface, which is configured to be coupled to a packet data network, and a host interface, which is configured to receive from a host processor, in response to a communication driver program running on the host processor, a single work item corresponding to multiple work requests submitted by one or more software processes running on the host processor to transmit respective messages over the network. Packet processing circuitry is configured to transmit via the network interface, in response to the single work item, multiple data packets carrying the respective messages to the network.

There is further provided, in accordance with an embodiment of the invention, a computer software product, including a non-transitory computer-readable medium in which program instructions are stored, which instructions, when read by a computer coupled to a packet data network by a network interface controller (NIC), cause the computer to run a communication driver program, which receives from one or more software processes running on the computer multiple work requests to transmit respective messages over the network, wherein the communication driver program causes the host processor to submit to the NIC a single work item corresponding to the multiple work requests, and wherein single work item causes the NIC to transmit multiple data packets carrying the respective messages to the network.

The present invention will be more fully understood from the following detailed description of the embodiments thereof, taken together with the drawings in which:

DETAILED DESCRIPTION OF EMBODIMENTS

In existing systems and models of interaction between software processes running on a host processor and a NIC, the communication driver program (such as a NIC driver) writes a WQE for each work request that is submitted, i.e., the host processor sends the NIC one WQE for each message that a process requests to send. Both writing the WQE in the host memory and fetching the WQE over the host bus incur overhead, which becomes particularly heavy (relative to the volume of data that is actually transmitted) when the messages themselves are short. For example, assuming the standard WQE in the system is 64 bytes, and a process submits a work request to convey a message carrying 64 bytes of data, the overhead is as large as the packet itself. Although NIC drivers can be configured to ring only a single doorbell for a group of WQEs, this measure alleviates only a small part of the overhead and may add latency in the actual transmission of the packets.

Embodiments of the present invention that are described herein are capable of grouping multiple work requests into a single WQE, so that execution of the WQE causes the NIC to send multiple messages. The multiple messages invoked by the WQE may be directed to the same target process on a destination node, or to multiple, different target processes, either at the same address or even at different addresses, on different nodes of the network. This arrangement can reduce substantially the overhead incurred by the host software and the NIC in generating, fetching and executing WQEs. Each time the NIC driver receives a work request posted by a client process, the driver may decide whether to accumulate the request into a multi-message WQE or to submit a WQE to the NIC immediately, based on decision criteria chosen so as to optimize the use of bus bandwidth without adding excessive latency in packet transmission.

Figure 1:
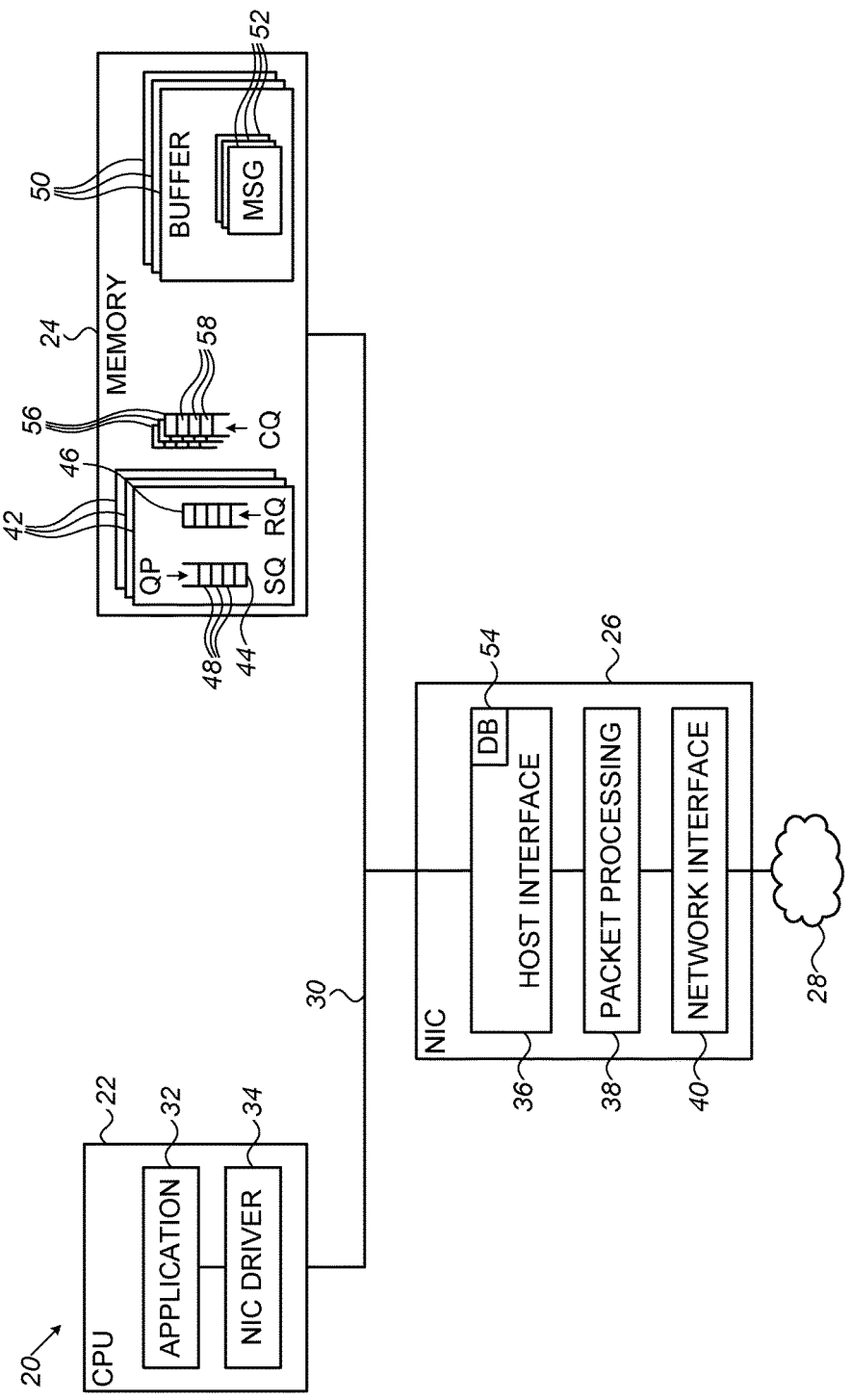
FIG. 1 is a block diagram that schematically illustrates a computer system, in accordance with an embodiment of the invention.

FIG. 1 is a block diagram that schematically illustrates a computer system 20, which supports multi-message WQEs in accordance with an embodiment of the invention. System 20 comprises a host processor, comprising a central processing unit (CPU) 22 (which typically comprises multiple processing cores), with a system memory 24 (also referred to as the host memory). System 20 is connected by a NIC 26 to a packet data network 28, such as an InfiniBand or Ethernet switch fabric. In this sense, system 20 may also be referred to as a network node. NIC 26 communicates with CPU 22 and memory 24 via a host bus 30, such as a PCI Express bus.

Typically (although not necessarily) CPU 22 and memory are parts of a general-purpose computer, which is programmed in software to carry out the functions that are described herein. This software may be downloaded to system 20 in electronic form, over a network, for example. Additionally or alternatively, the software may be stored on tangible, non-transitory computer-readable media, such as optical, magnetic, or electronic memory media. Further alternatively or additionally, system 20 may comprise a special-purpose computer and/or hardware logic that is programmed or otherwise designed to carry out these functions.

NIC 26 comprises a host interface 36, which is connected to bus 30, and a network interface 40, which is connected to network 28. Packet processing circuitry 38 in NIC 26 receives WQEs fetched by host interface 36 from memory 24 and executes the WQEs, which causes circuitry 38 to transmit packets via network interface 40 to network 28.

As explained earlier, in order to transmit messages over network 28, client processes running on CPU 22, such as an application process 32, submit work requests to a NIC driver 34, which is likewise implemented as a program running on CPU 22. For each such message, the work request indicates the location of corresponding message data 52 in a buffer 50 in memory 24. The message data comprises the payload to be transmitted in the message packet or packets, and may also contain packet headers. Alternatively, packet headers may be created by packet processing circuitry 38 in NIC.

NIC driver 34 allocates one or more queue pairs (QPs) 42 to each client process, such as application process 32. QP 42 comprises a send queue (SQ) 44 and a receive queue (RQ) 46. In response to the work requests from process 32 to transmit messages over network 28, driver 34 creates and queues WQEs 48 in send queue 44. In contrast to the interaction model of conventional drivers and NICs, however, each WQE 48 in system 20 may correspond either to a single work request or to multiple work requests, and hence multiple messages. The process of WQE creation is described further hereinbelow with reference to FIG. 2. NIC 26 and driver 34 also handle incoming packets from network 28, typically using receive WQEs in receive queue 46, but these aspects of the operation of system 20 are beyond the scope of the present description.

Each WQE 48 is a data structure comprising a control segment, which informs NIC 26 of the type of operation required, and a data segment, which contains message data or indicates the location and length of the corresponding message data 52 (referred to as a "gather list") in memory 24. (WQE 48 typically contains other fields, as well, which will be familiar to those skilled in the art and are omitted here for the sake of brevity.) In the present embodiment, the control segment of WQE 48 comprises an opcode field, which indicates, inter alia, whether the WQE corresponds to a single message or multiple messages.

A multi-message WQE typically also contains information regarding the respective destinations of the messages. In InfiniBand convention, each QP 42, and hence each WQE 48 posted to the QP, may be dedicated to a single destination process. For Ethernet communications and some InfiniBand transport services, however, a single QP may serve communications between process 32 and multiple destinations, which may be located on multiple different nodes of network 28 (and possibly on the transmitting node itself, in the case of virtualized networks). In this latter case, either WQE 48 itself contains an indication of the destination address and other header data for each packet to be generated by circuitry 38, which then creates the packet headers accordingly; or the packet headers are created by process 32 (or possibly by driver 34) and written to buffer 50 as a part of message data 52.

After writing a WQE to send queue 44, NIC driver 34 writes a command to a doorbell (DB) register 54 of NIC 26 on bus 30. The doorbell causes host interface 36 to fetch the next WQE (or WQEs) 48 from queue 44. Circuitry 38 executes the WQE and, accordingly, reads the corresponding message data 52 from buffer 50 via host interface 36 and then transmits packets containing the message data via network interface 40 to the appropriate addresses on network 28. In the case of multi-message WQEs, the resulting packets may be sent to multiple different, respective addresses, as specified by the work requests and/or by packet headers included in message data 52.

After completing transmission of the message or messages corresponding to a given WQE 48 (or possibly after having received acknowledgment of the messages from the destination nodes, in the case of reliable transmission), packet processing circuitry 38 writes a completion report, referred to as a completion queue element (CQE) 58, to a completion queue 56 in memory 24. Host interface 36 may raise an interrupt on CPU 22 in order to inform NIC driver 34 that a new CQE has been posted. Driver 34 reads CQE 58 and informs process 32 that the corresponding work request or requests have been fulfilled.

Figure 2:
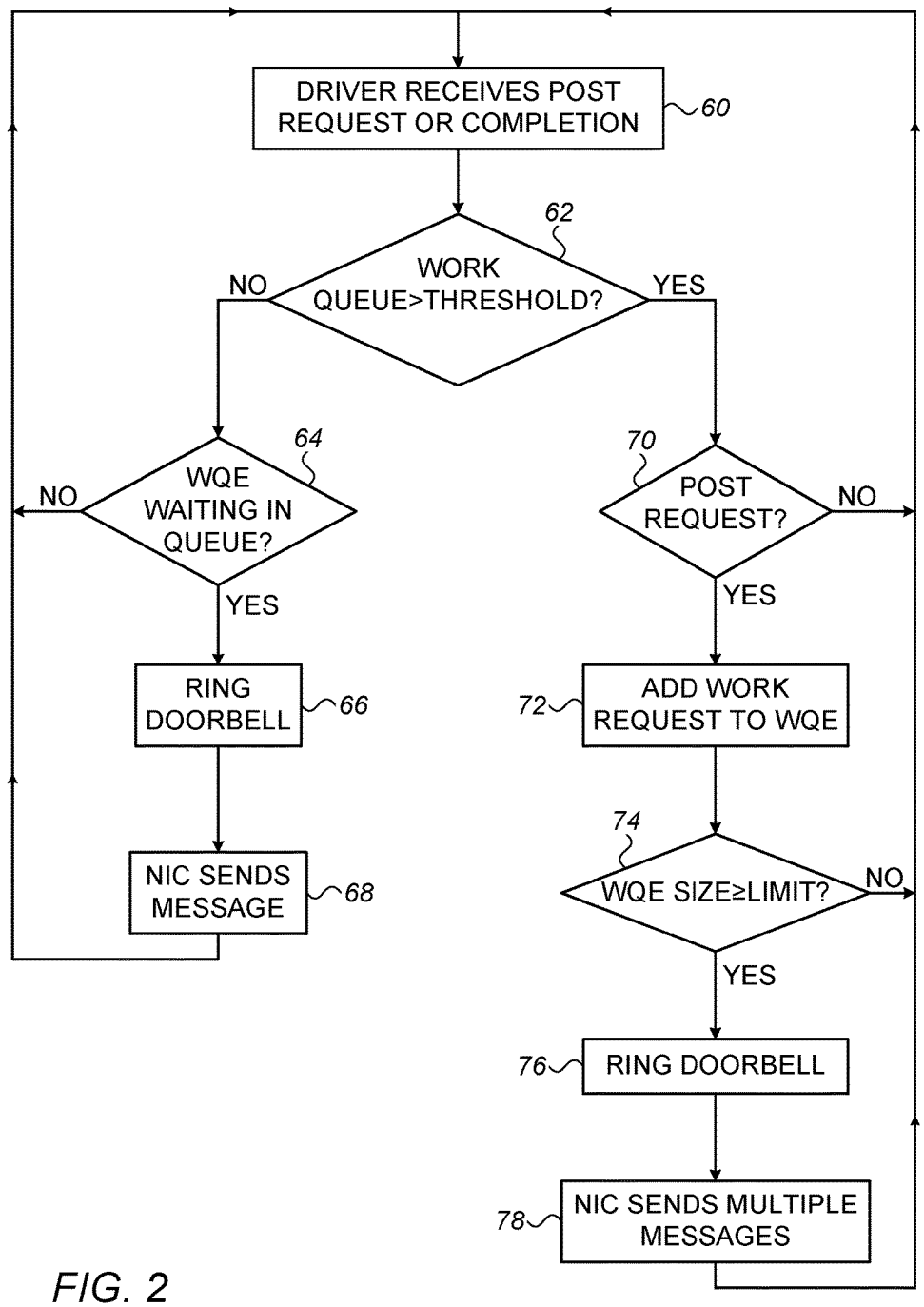
FIG. 2 is a flow chart that schematically illustrates a method for sending messages from a computer over a network, in accordance with an embodiment of the invention.

FIG. 2 is a flow chart that schematically illustrates a method for sending messages from computer system 20 over network 28, in accordance with an embodiment of the invention. It is assumed in this embodiment that for the sake of efficient use of the resources of CPU 22, driver 34 is not active at all times, but rather wakes and takes action only in response to events requiring its attention. Thus, driver 34 initiates the method of FIG. 2, at a driver alert step 60, either when a work request is posted by a client process, such as process 32, or when NIC 26 writes a CQE 58 to completion queue 56.

Upon receiving a work request or CQE, driver 34 checks the number of WQEs 48 waiting in the corresponding send queue 44, at a queue checking step 62. If the number of WQEs is below a predefined threshold, and a new work request for the queue was received at step 60, driver 34 immediately posts a corresponding new WQE in the queue. Otherwise, driver 34 checks whether a WQE posted previously is waiting in the queue, at a WQE checking step 64. In either case, when there is a WQE (either previously or newly posted) in the queue awaiting execution, driver 34 proceeds to write to doorbell register 54, thus alerting NIC 26 to service the WQE, at a doorbell ringing step 66. In response to the doorbell, NIC 26 reads the WQE from the queue and sends the corresponding message over network 28, at a message transmission step 68. This branch of the method of FIG. 2 ensures that when the level of activity on a given QP is low, NIC 26 will service the corresponding WQEs promptly, thereby ensuring low latency in message transmission.

On the other hand, when driver 34 finds the number of WQEs in send queue 44 to be above the threshold at step 62, the driver may accumulate multiple work requests together into a multi-message WQE in order to conserve processing resources and bandwidth on bus 30. For this purpose, driver 34 checks whether a new work request has been posted, at a request checking step 70. If so, driver 34 adds the work request to a multi-message WQE that the driver is currently constructing, at a WQE accumulation step 72.

Driver 34 then checks whether the size of the WQE (in terms of the number of messages or volume of data involved, for example) has reached or exceeded a predefined limit, at a size checking step 74. If not, the driver takes no further action until the next time it is alerted at step 60. If the WQE size has reached the limit, however, driver 34 writes to doorbell register 54, at a doorbell ringing step 76. NIC 26 reads and executes the multi-message WQE, and accordingly transmits multiple packets over network 28, at a packet transmission step 78, thus sending the multiple messages requested by process 32.

Following step 68 or 78, the method returns to step 60 to await the next work request or completion event.

Additionally or alternatively at step 62, driver 34 may, upon receiving a work request, check the size of the message to be transmitted in response to the work request, and may decide on the basis of the size of the message, whether to accumulate the work request into a single WQE together with other work requests, or to submit a non-accumulated WQE to the NIC, corresponding only to this work request. Typically, if the message size exceeds a certain threshold, driver 34 will queue a WQE immediately, regardless of the current queue size, since in this case the overhead incurred, relative to the amount of data transferred, is small. On the other hand, if the message size is below the size threshold, while the queue size is found at step 62 to be above the queue length threshold, driver 34 will wait until sufficient work requests have accumulated before generating a multi-message WQE.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    receiving, by a driver running on a computer, multiple work requests from at least one process running on the computer, wherein each of the multiple work requests instructs to transmit a respective message over a network;
    submitting, by the driver, to a network interface controller (NIC) connected to the computer, a single work item instructing to transmit the respective messages of the multiple work requests, with a respective separate header for each of the messages, wherein the submitting is performed by writing the single work item to a host memory of the computer;
    fetching the single work item from the host memory by the NIC;
    in response to the single work item, retrieving a payload of each of the respective messages of the multiple work requests, by the NIC;
    creating separate headers for each of the respective messages of the multiple work requests, to form multiple data packets; and
    transmitting the multiple data packets, including for each of the messages one or more packets carrying the respective message payload and created respective separate header, from the NIC to the network.

2. The method according to claim 1, wherein submitting the single work item comprises, upon receiving a work request, checking a status of a queue to which the work item is to be submitted, and deciding, responsively to the status of the queue, whether to accumulate the work request into the single work item corresponding to the multiple work requests or to submit to the NIC a non-accumulated work item corresponding to the work request.

3. The method according to claim 2, wherein deciding whether to accumulate the work request comprises accumulating the work request into the single work item when a size of the queue is greater than a predefined threshold, and submitting the non-accumulated work item when the size of the queue is less than the predefined threshold.

4. The method according to claim 1, wherein submitting the single work item comprises, upon receiving a work request, checking a size of a message to be transmitted in response to the work request, and deciding, responsively to the size of the message, whether to accumulate the work request into the single work item corresponding to the multiple work requests or to submit to the NIC a non-accumulated work item corresponding to the work request.

5. The method according to claim 4, wherein deciding whether to accumulate the work request comprises accumulating the work request into the single work item when the size of the message is less than a predefined threshold, and submitting the non-accumulated work item when the size of the message is greater than the predefined threshold.

6. The method according to claim 1, wherein transmitting the multiple data packets comprises conveying over the network, in response to the single work item, at least first and second messages directed respectively to at least first and second different target processes on at least one destination node.

7. The method according to claim 6, wherein conveying at least the first and second messages comprises transmitting the first and second messages to different addresses, on different nodes of the network, in response to the single work item.

8. A communication system, comprising:
a network interface controller (NIC), which is configured to be coupled to a packet data network;
a host memory; and
a host processor, which is connected to the NIC and is configured to run a communication driver program, which receives from one or more software processes running on the host processor multiple work requests, wherein each of the multiple work requests instructs to transmit a respective message over the network, and which causes the host processor to submit to the NIC a single work item instructing to transmit the respective messages of the multiple work requests, with a respective separate header for each of the messages, wherein the submitting is performed by writing the single work item to the host memory,
wherein the NIC is configured to fetch the single work item from the host memory, to retrieve a payload of each of the respective messages of the multiple work requests in response to the single work item, to create separate headers for each of the respective messages of the multiple work requests, so as to form multiple data packets, and to transmit the multiple data packets, including for each of the messages one or more packets carrying the respective message payload and created respective separate header, to the network.

9. The system according to claim 8, wherein communication driver program causes the host processor, upon receiving a work request, to check a status of a queue to which the work item is to be submitted, and to decide, responsively to the status of the queue, whether to accumulate the work request into the single work item corresponding to the multiple work requests or to submit to the NIC a non-accumulated work item corresponding to the work request.

10. The system according to claim 9, wherein the communication driver program causes the host processor to accumulate the work request into the single work item when a size of the queue is greater than a predefined threshold, and to submit the non-accumulated work item when the size of the queue is less than the predefined threshold.

11. The system according to claim 8, wherein the communication driver program causes the host processor, upon receiving a work request, to check a size of a message to be transmitted in response to the work request, and to decide, responsively to the size of the message, whether to accumulate the work request into the single work item corresponding to the multiple work requests or to submit to the NIC a non-accumulated work item corresponding to the work request.

12. The system according to claim 11, wherein the communication driver program causes the host processor to accumulate the work request into the single work item when the size of the message is less than a predefined threshold, and to submit the non-accumulated work item when the size of the message is greater than the predefined threshold.

13. The system according to claim 8, wherein the NIC is configured to convey over the network, in response to the single work item, at least first and second messages directed respectively to at least first and second different target processes on at least one destination node.

14. The system according to claim 13, wherein the NIC is configured to transmit the first and second messages to different addresses, on different nodes of the network, in response to the single work item.

15. Communication apparatus, comprising:
a network interface connector, which is configured to be coupled to a packet data network;
a host interface connector, which is configured to be coupled to a host memory and a host processor, which runs a communication driver program that writes to the host memory a single work item corresponding to multiple work requests submitted by one or more software processes running on the host processor, wherein each of the multiple work requests instructs to transmit a respective message over the network, with a respective separate header for each of the messages; and
packet processing circuitry, which is configured to fetch the single work item from the host memory, to retrieve a payload of each of the respective messages of the multiple work requests in response to the single work item, to create separate headers for each of the respective messages of the multiple work requests, so as to form multiple data packets, and to transmit the multiple data packets via the network interface connector, including for each of the messages one or more packets carrying the respective message payload and created respective separate header, to the network.

16. A computer software product, comprising a non-transitory computer-readable medium in which program instructions are stored, which instructions, when read by a computer coupled to a packet data network by a network interface controller (NIC), cause the computer to run a communication driver program, which receives from one or more software processes running on the computer multiple work requests, wherein each of the multiple work requests instructs to transmit a respective message over the network, wherein the communication driver program causes a host processor of the computer to submit to the NIC a single work item instructing to transmit the respective messages of the multiple work requests, with a respective separate header for each of the messages, wherein the submitting is performed by writing the single work item to a host memory of the computer, and wherein the single work item, when fetched by the NIC from the host memory, causes the NIC to retrieve a payload of each of the respective messages of the multiple work requests, to create separate headers for each of the respective messages of the multiple work requests, so as to form multiple data packets, and to transmit the multiple data packets, including for each of the messages one or more packets carrying the respective message payload and created respective separate header, to the network.

17. The method according to claim 1, wherein the NIC is connected to the computer through a bus.

18. The method according to claim 1, wherein writing the single work item to the host memory comprises writing the single work item to a send queue of a queue pair.

19. The method according to claim 18, wherein writing the single work item to the host memory comprises writing a work item including for multiple messages, respective different addresses.

20. The method according to claim 1, wherein transmitting multiple data packets from the NIC to the network comprises fetching the messages and corresponding headers from a location in the host memory indicated by the single work item.

* * * * *